US012446976B2

(12) United States Patent
Feather et al.

(10) Patent No.: US 12,446,976 B2
(45) Date of Patent: Oct. 21, 2025

(54) SYSTEM AND METHOD FOR HYBRID CONTROL USING EYE TRACKING

(71) Applicant: INTUITIVE SURGICAL OPERATIONS, INC., Sunnyvale, CA (US)

(72) Inventors: Heath Feather, Cupertino, CA (US); Brandon D. Itkowitz, San Jose, CA (US); Alexandre V. Matveev, Santa Clara, CA (US)

(73) Assignee: INTUITIVE SURGICAL OPERATIONS, INC., Sunnyvale, CA (US)

(*) Notice: Subject to any disclaimer, the term of this patent is extended or adjusted under 35 U.S.C. 154(b) by 1083 days.

(21) Appl. No.: 17/055,073

(22) PCT Filed: May 15, 2019

(86) PCT No.: PCT/US2019/032479
§ 371 (c)(1),
(2) Date: Nov. 12, 2020

(87) PCT Pub. No.: WO2019/222395
PCT Pub. Date: Nov. 21, 2019

(65) Prior Publication Data
US 2021/0212773 A1    Jul. 15, 2021

Related U.S. Application Data

(60) Provisional application No. 62/672,467, filed on May 16, 2018.

(51) Int. Cl.
*A61B 34/00*    (2016.01)
*A61B 34/20*    (2016.01)
(Continued)

(52) U.S. Cl.
CPC .............. *A61B 34/25* (2016.02); *A61B 34/20* (2016.02); *A61B 34/37* (2016.02); *A61B 90/361* (2016.02);
(Continued)

(58) Field of Classification Search
CPC ......... A61B 34/25; A61B 34/20; A61B 34/37; A61B 90/361; A61B 90/37;
(Continued)

(56) References Cited

U.S. PATENT DOCUMENTS 6,578,962 B1    6/2003   Amir et al.
10,278,782 B2   5/2019   Jarc et al.
(Continued)

FOREIGN PATENT DOCUMENTS

WO    WO-2016191298 A1    12/2016

OTHER PUBLICATIONS

International Preliminary Report on Patentability for Application No. PCT/US2019/032479, mailed on Nov. 26, 2020, 7 pages.
(Continued)

*Primary Examiner* — Patrick N Edouard
*Assistant Examiner* — Eboni N Giles
(74) *Attorney, Agent, or Firm* — Haynes & Boone, LLP.

(57) ABSTRACT

A console for a medical includes a display, an eye tracking input module, a second input module, and one or more processors coupled to the display, the eye tracking input module, and the second input module. The one or more processors is configured to perform operations including receiving a first user input from the eye tracking input module; determining, based on the first user input, whether a gaze of a user is directed toward an activation region of the display; in response to determining that the gaze of the user is directed toward the activation region, displaying, via the
(Continued)

display, a control; receiving a second user input from the second input module; and adjusting the control based on the second user input.

20 Claims, 8 Drawing Sheets

(51) Int. Cl.
*A61B 34/37* (2016.01)
*A61B 90/00* (2016.01)

(52) U.S. Cl.
CPC ...... *A61B 90/37* (2016.02); *A61B 2034/2051* (2016.02); *A61B 2034/2059* (2016.02); *A61B 2034/2061* (2016.02); *A61B 2090/368* (2016.02); *A61B 2090/3735* (2016.02); *A61B 2090/374* (2016.02); *A61B 2090/3762* (2016.02); *A61B 2090/378* (2016.02)

(58) Field of Classification Search
CPC .... A61B 2034/2051; A61B 2034/2059; A61B 2034/2061; A61B 2090/368; A61B 2090/3735; A61B 2090/374; A61B 2090/3762; A61B 2090/378
See application file for complete search history.

(56) References Cited

U.S. PATENT DOCUMENTS

| | | | |
|---|---|---|---|
| 11,033,299 B2* | 6/2021 | Silver | A61B 17/3421 |
| 2009/0248036 A1* | 10/2009 | Hoffman | A61B 1/00149 606/130 |
| 2013/0030571 A1* | 1/2013 | Ruiz Morales | G06F 3/04847 700/259 |
| 2013/0107207 A1 | 5/2013 | Zhao et al. | |
| 2013/0231681 A1* | 9/2013 | Robinson | A61B 18/1206 606/130 |
| 2013/0303890 A1* | 11/2013 | Duindam | G06T 7/0012 382/103 |
| 2014/0024889 A1 | 1/2014 | Xiaoli | |
| 2017/0076503 A1* | 3/2017 | Tamaoki | G06F 3/017 |
| 2017/0235360 A1* | 8/2017 | George-Svahn | G02B 27/017 345/173 |
| 2021/0393339 A1* | 12/2021 | Johnson | A61B 34/74 |

OTHER PUBLICATIONS

International Search Report and Written Opinion for Application No. PCT/US2019/032479, mailed on Sep. 19, 2019, 10 pages.

Vertut, Jean and Phillipe Coiffet, Robot Technology: Teleoperation and Robotics Evolution and Development, English translation, Prentice-Hall, Inc., Inglewood Cliffs, NJ, USA 1986, vol. 3A, 332 pages.

* cited by examiner

SYSTEM AND METHOD FOR HYBRID
CONTROL USING EYE TRACKING

RELATED APPLICATIONS

This application is the U.S. national phase of International Application No. PCT/US2019/032479, filed May 15, 2019, which designated the U.S. and claims priority to and the benefit of U.S. Provisional Patent Application No. 62/672,467, filed May 16, 2018 and entitled "System and Method for Hybrid Control Using Eye Tracking,", all of which are incorporated by reference herein in their entirety.

TECHNICAL FIELD

The present disclosure is directed to systems for controlling medical systems and more particularly to a system for hybrid control of a medical system using eye tracking.

BACKGROUND

Medical robotic systems such as teleoperational systems used in performing minimally invasive surgical procedures offer many benefits over traditional open surgery techniques, including less pain, shorter hospital stays, quicker return to normal activities, minimal scarring, reduced recovery time, and less injury to tissue. Consequently, demand for such medical teleoperational systems is strong and growing.

Examples of medical teleoperational systems include the da Vinci® Surgical System and the da Vinci® S™ Surgical System from Intuitive Surgical, Inc., of Sunnyvale, Calif. Each of these systems includes a surgeon's console, a patient-side cart, a high performance three-dimensional ("3-D") vision system, and one or more medical instruments coupled to the patient-side cart.

During the performance of a medical procedure, it is useful to provide an immersive environment for an operator operating the medical teleoperational system through the surgeon's console. For example, an immersive environment may be one that allows the operator to focus and/or concentration on relevant tasks while conveying a sense of presence at the surgical site. A surgeon's console with an easy-to-use, intuitive interface tends to increase the immersive effect, whereas a cluttered, difficult-to-use interface may diminish the sense of immersion. A surgeon's console that provides an immersive environment may enhance the speed, safety, and/or overall likelihood of success of the surgical procedure.

Accordingly, it would be advantageous to provide a medical system that provides an immersive environment for the operator.

SUMMARY

The embodiments of the invention are best summarized by the claims that follow the description.

According to some embodiments, a console for a medical system may include a display, an eye tracking input module, a second input module, and one or more processors coupled to the display, the eye tracking input module, and the second input module. The one or more processors may be configured to perform operations including receiving a first user input from the eye tracking input module; determining, based on the first user input, whether a gaze of a user is directed toward an activation region of the display; in response to determining that the gaze of the user is directed toward the activation region, displaying, via the display, a control; receiving a second user input from the second input module; and adjusting the control based on the second user input.

According to some embodiments, a system may include a memory and one or more processors coupled to the memory. The one or more processors may be configured to read instructions from the memory and perform operations including receiving a first input from an eye tracker, the first input corresponding to a gaze point of a user relative to a display; determining, based on the first input, whether the gaze point is within an activation region of the display; in response to determining that the gaze point is within the activation region, activating a control; receiving a second input from an input device; and adjusting the control based on the second input.

According to some embodiments, a method may include determining a gaze point of a user relative to a display; determining whether the gaze point is within an activation region of the display; in response to determining that the gaze point is within the activation region, activating a control; receiving a manual input of the user; and adjusting the control based on the manual input.

According to some embodiments, a non-transitory machine-readable medium including a plurality of machine-readable instructions which when executed by one or more processors are adapted to cause the one or more processors to perform any of the methods described herein.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

DETAILED DESCRIPTION

Figure 1:
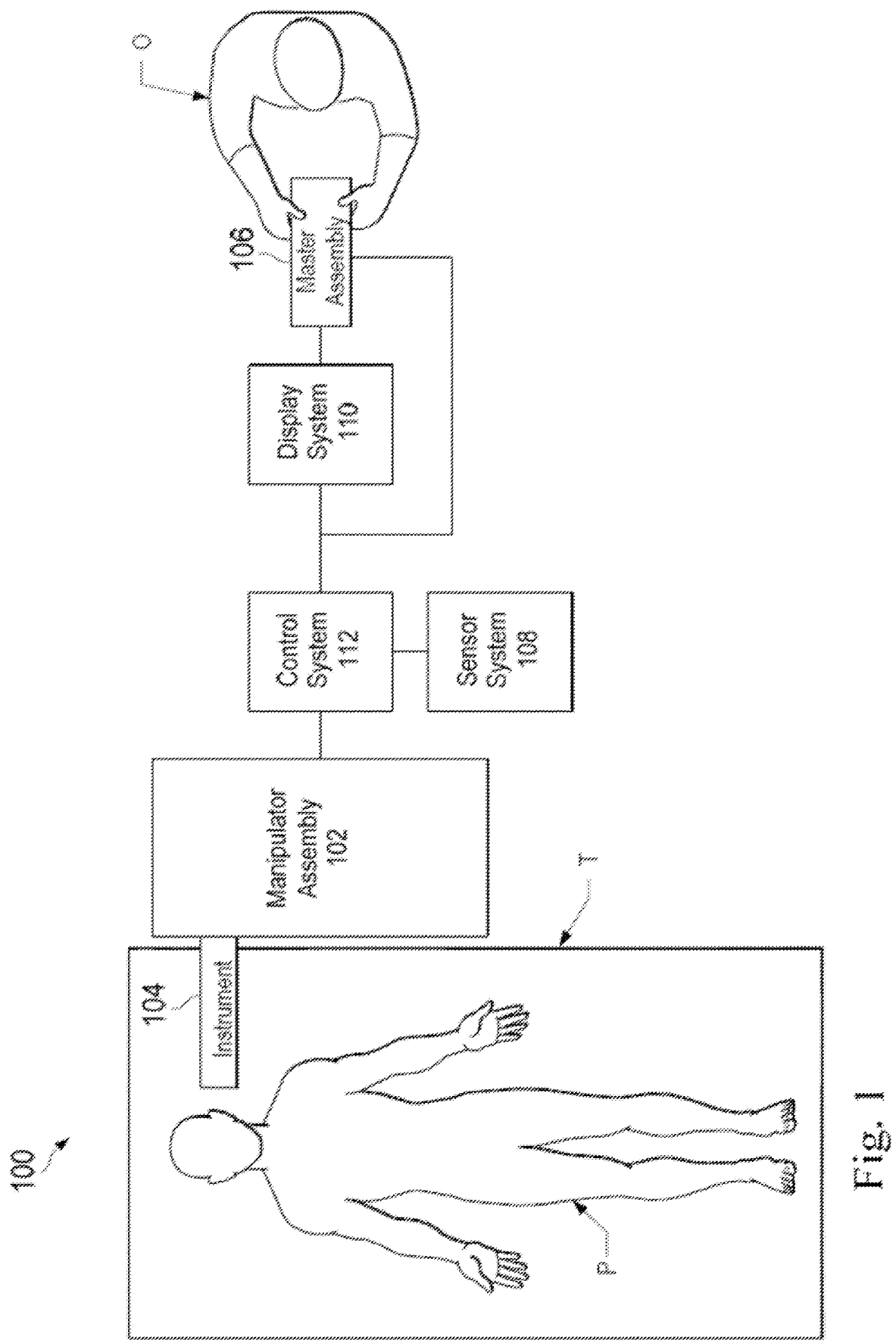
FIG. 1 is a simplified diagram of a teleoperated medical system, in accordance with embodiments of the present disclosure.

In the following description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In some instances well known methods, procedures, components, and circuits have not been described in detail so as not to unnecessarily obscure aspects of the embodiments.

The embodiments below will describe various instruments and portions of instruments in terms of their state in three-dimensional space. As used herein, the term "position" refers to the location of an object or a portion of an object in a three-dimensional space (e.g., three degrees of translational freedom that can be described using changes in Cartesian X, Y, Z coordinates, such as along Cartesian X, Y, Z axes). As used herein, the term "orientation" refers to the rotational placement of an object or a portion of an object (three degrees of rotational freedom—e.g., which can be described using roll, pitch, and yaw). As used herein, the term "pose" refers to the position of an object or a portion of an object in at least one degree of translational freedom, and to the orientation of that object or that portion of that object in at least one degree of rotational freedom. For an asymmetric, rigid body in a three-dimensional space, a full pose can be described with six total degrees of freedom.

Also, although some of the examples described herein refer to surgical procedures or tools, or medical procedures and medical tools, the techniques disclosed apply to non-medical procedures and non-medical tools. For example, the tools, systems, and methods described herein may be used for non-medical purposes including industrial uses, general robotic uses, and sensing or manipulating non-tissue work pieces. Other example applications involve cosmetic improvements, imaging of human or animal anatomy, gathering data from human or animal anatomy, setting up or taking down the system, and training medical or non-medical personnel. Additional example applications include use for procedures on tissue removed from human or animal anatomies (without return to a human or animal anatomy), and performing procedures on human or animal cadavers. Further, these techniques can also be used for surgical and nonsurgical, medical treatment or diagnosis procedures.

FIG. 1 is a simplified diagram of a teleoperated medical system 100 according to some embodiments. In some embodiments, teleoperated medical system 100 may be suitable for use in, for example, surgical, diagnostic, therapeutic, or biopsy procedures. As shown in FIG. 1, medical system 100 generally includes a manipulator assembly 102 for operating a medical instrument 104 in performing various procedures on a patient P. Manipulator assembly may be teleoperated or may include both teleoperational and non-teleoperational sub-assemblies for manual, robotic, and/or teleoperated control of medical instrument 104. Manipulator assembly 102 is mounted to or near an operating table T. An operator input system such as a master assembly 106 allows an operator O (e.g., a surgeon, a clinician, or a physician as illustrated in FIG. 1) to view the interventional site and to control manipulator assembly 102.

Master assembly 106 may be located at an operator's console which is usually located in the same room as operating table T, such as at the side of a surgical table on which patient P is located. However, it should be understood that operator O can be located in a different room or a completely different building from patient P. Master assembly 106 generally includes one or more control devices for controlling manipulator assembly 102. The control devices may include any number of a variety of input devices, such as joysticks, trackballs, data gloves, trigger-guns, hand-operated controllers, voice recognition devices, body motion or presence sensors, and/or the like. To provide operator O a strong sense of directly controlling instruments 104 the control devices may be provided with the same degrees of freedom as the associated medical instrument 104. In this manner, the control devices provide operator O with telepresence or the perception that the control devices are integral with medical instruments 104.

In some embodiments, the control devices may have more or fewer degrees of freedom than the associated medical instrument 104 and still provide operator O with telepresence. In some embodiments, the control devices may optionally be manual input devices which move with six degrees of freedom, and which may also include a handle for actuating instruments (for example, for closing grasping jaws, applying an electrical potential to an electrode, delivering a medicinal treatment, and/or the like).

Manipulator assembly 102 supports medical instrument 104 and may include a kinematic structure of one or more non-servo controlled links (e.g., one or more links that may be manually positioned and locked in place, generally referred to as a set-up structure) and a teleoperational manipulator. Manipulator assembly 102 or more specifically the teleoperational manipulator may optionally include a plurality of actuators or motors that drive inputs on medical instrument 104 in response to commands from the control system (e.g., a control system 112). The actuators may optionally include drive systems that when coupled to medical instrument 104 may advance medical instrument 104 into a naturally or surgically created anatomic orifice. Other drive systems may move the distal end of medical instrument 104 in multiple degrees of freedom, which may include three degrees of linear motion (e.g., linear motion along the X, Y, Z Cartesian axes) and in three degrees of rotational motion (e.g., rotation about the X, Y, Z Cartesian axes). Additionally, the actuators can be used to actuate an articulable end effector of medical instrument 104 for grasping tissue in the jaws of a biopsy device and/or the like. Actuator position sensors such as resolvers, encoders, potentiometers, and other mechanisms may provide sensor data to medical system 100 describing the rotation and orientation of the motor shafts. This position sensor data may be used to determine motion of the objects manipulated by the actuators.

Teleoperated medical system 100 may include a sensor system 108 with one or more sub-systems for receiving information about the instruments of manipulator assembly 102. Such sub-systems may include a position/location sensor system (e.g., an electromagnetic (EM) sensor system); a shape sensor system for determining the position, orientation, speed, velocity, pose, and/or shape of a distal end and/or of one or more segments along a flexible body that may make up medical instrument 104; and/or a visualization system for capturing images from the distal end of medical instrument 104.

Teleoperated medical system 100 also includes a display system 110 for displaying an image or representation of the surgical site and medical instrument 104 generated by subsystems of sensor system 108. Display system 110 and master assembly 106 may be oriented so operator O can control medical instrument 104 and master assembly 106 with the perception of telepresence.

In some embodiments, medical instrument 104 may have a visualization system (discussed in more detail below), which may include a viewing scope assembly that records a concurrent or real-time image of a surgical site and provides the image to the operator or operator O through one or more displays of medical system 100, such as one or more displays of display system 110. The concurrent image may be, for example, a two or three dimensional image captured by an endoscope positioned within the surgical site. In some embodiments, the visualization system includes endoscopic components that may be integrally and/or removably coupled to medical instrument 104. However in some embodiments, a separate endoscope, attached to a separate manipulator assembly may be used with medical instrument 104 to image the surgical site. The visualization system may be implemented as hardware, firmware, software or a combination thereof which interact with or are otherwise executed by one or more computer processors, which may include the processors of a control system 112. The processors of the control system 112 may execute instructions corresponding to methods and operators described herein.

Display system 110 may also display an image of the surgical site and medical instruments captured by the visualization system. In some examples, teleoperated medical system 100 may configure medical instrument 104 and controls of master assembly 106 such that the relative positions of the medical instruments are similar to the relative positions of the eyes and hands of operator O. In this manner operator O can manipulate medical instrument 104 and the hand control as if viewing the workspace in substantially true presence. By true presence, it is meant that the presentation of an image is a true perspective image simulating the viewpoint of an operator that is physically manipulating medical instrument 104.

In some examples, display system 110 may present images of a surgical site recorded pre-operatively or intra-operatively using image data from imaging technology such as, computed tomography (CT), magnetic resonance imaging (MRI), fluoroscopy, thermography, ultrasound, optical coherence tomography (OCT), thermal imaging, impedance imaging, laser imaging, nanotube X-ray imaging, and/or the like. The pre-operative or intra-operative image data may be presented as two-dimensional, three-dimensional, or four-dimensional (including e.g., time based or velocity based information) images and/or as images from models created from the pre-operative or intra-operative image data sets.

In some embodiments, often for purposes of imaged guided surgical procedures, display system 110 may display a virtual navigational image in which the actual location of medical instrument 104 is registered (i.e., dynamically referenced) with the preoperative or concurrent images/model. This may be done to present the operator O with a virtual image of the internal surgical site from a viewpoint of medical instrument 104. In some examples, the viewpoint may be from a tip of medical instrument 104. An image of the tip of medical instrument 104 and/or other graphical or alphanumeric indicators may be superimposed on the virtual image to assist operator O controlling medical instrument 104. In some examples, medical instrument 104 may not be visible in the virtual image.

In some embodiments, display system 110 may display a virtual navigational image in which the actual location of medical instrument 104 is registered with preoperative or concurrent images to present the operator O with a virtual image of medical instrument 104 within the surgical site from an external viewpoint. An image of a portion of medical instrument 104 or other graphical or alphanumeric indicators may be superimposed on the virtual image to assist operator O in the control of medical instrument 104. As described herein, visual representations of data points may be rendered to display system 110. For example, measured data points, moved data points, registered data points, and other data points described herein may be displayed on display system 110 in a visual representation. The data points may be visually represented in a user interface by a plurality of points or dots on display system 110 or as a rendered model, such as a mesh or wire model created based on the set of data points. In some examples, the data points may be color coded according to the data they represent. In some embodiments, a visual representation may be refreshed in display system 110 after each processing operation has been implemented to alter the data points. In some embodiments, a virtual navigational image may be presented in the display system 110 that depicts a model of an anatomical passageway from a perspective of an instrument being inserted along or through a corresponding actual anatomical passageway.

Teleoperated medical system 100 may also include control system 112. Control system 112 includes at least one memory and at least one computer processor (not shown) for effecting control between medical instrument 104, master assembly 106, sensor system 108, and display system 110. Control system 112 also includes programmed instructions (e.g., a non-transitory machine-readable medium storing the instructions) to implement some or all of the methods described in accordance with aspects disclosed herein, including instructions for providing information to display system 110. While control system 112 is shown as a single block in the simplified schematic of FIG. 1, the system may include two or more data processing circuits with one portion of the processing optionally being performed on or adjacent to manipulator assembly 102, another portion of the processing being performed at master assembly 106, and/or the like. The processors of control system 112 may execute instructions comprising instruction corresponding to processes disclosed herein and described in more detail below. Any of a wide variety of centralized or distributed data processing architectures may be employed. Similarly, the programmed instructions may be implemented as a number of separate programs or subroutines, or they may be integrated into a number of other aspects of the teleoperational systems described herein. In one embodiment, control system 112 supports wireless communication protocols such as Bluetooth, IrDA, HomeRF, IEEE 802.11, DECT, and Wireless Telemetry.

In some embodiments, control system 112 may receive force and/or torque feedback from medical instrument 104. Responsive to the feedback, control system 112 may transmit signals to master assembly 106. In some examples, control system 112 may transmit signals instructing one or more actuators of manipulator assembly 102 to move medical instrument 104. Medical instrument 104 may extend into an internal surgical site within the body of patient P via openings in the body of patient P. Any suitable conventional and/or specialized actuators may be used. In some examples, the one or more actuators may be separate from, or integrated with, manipulator assembly 102. In some embodiments, the one or more actuators and manipulator assembly 102 are provided as part of a teleoperational cart positioned adjacent to patient P and operating table T.

Control system 112 may optionally further include a virtual visualization system to provide navigation assistance to operator O when controlling medical instrument 104 during an image-guided surgical procedure. Virtual navigation using the virtual visualization system may be based upon reference to an acquired preoperative or intraoperative dataset of anatomic passageways. The virtual visualization system processes images of the surgical site imaged using imaging technology such as computerized tomography (CT), magnetic resonance imaging (MRI), fluoroscopy, thermography, ultrasound, optical coherence tomography (OCT), thermal imaging, impedance imaging, laser imaging, nanotube X-ray imaging, and/or the like. Software, which may be used in combination with manual inputs, is used to convert the recorded images into segmented two dimensional or three dimensional composite representation of a partial or an entire anatomic organ or anatomic region. An image data set is associated with the composite representation. The composite representation and the image data set describe the various locations and shapes of the passageways and their connectivity. The images used to generate the composite representation may be recorded preoperatively or intra-operatively during a clinical procedure. In some embodiments, a virtual visualization system may use standard representations (i.e., not patient specific) or hybrids of a standard representation and patient specific data. The composite representation and any virtual images generated by the composite representation may represent the static posture of a deformable anatomic region during one or more phases of motion (e.g., during an inspiration/expiration cycle of a lung).

During a virtual navigation procedure, sensor system 108 may be used to compute an approximate location of medical instrument 104 with respect to the anatomy of patient P. The location can be used to produce both macro-level (external) tracking images of the anatomy of patient P and virtual internal images of the anatomy of patient P. The system may implement one or more electromagnetic (EM) sensor, fiber optic sensors, and/or other sensors to register and display a medical implement together with preoperatively recorded surgical images, such as those from a virtual visualization system, are known. For example, PCT Publication WO 2016/191298 (published Dec. 1, 2016) (disclosing "Systems and Methods of Registration for Image Guided Surgery"), which is incorporated by reference herein in its entirety, discloses such one system. Teleoperated medical system 100 may further include optional operations and support systems (not shown) such as illumination systems, steering control systems, irrigation systems, and/or suction systems. In some embodiments, teleoperated medical system 100 may include more than one manipulator assembly and/or more than one master assembly. The exact number of manipulator assemblies will depend on the surgical procedure and the space constraints within the operating room, among other factors. Master assembly 106 may be collocated or they may be positioned in separate locations. Multiple master assemblies allow more than one operator to control one or more manipulator assemblies in various combinations.

FIGS. 2A-2E are simplified diagrams of a console 200 of a medical system according to some embodiments. According to some embodiments consistent with FIG. 1, console 200 may be incorporated into a medical system, such as teleoperated medical system 100. Consistent with such embodiments, console 200 may be operated by an operator, such as operator O, during a surgical procedure. However, it is to be understood that console 200 may be used in a variety of other contexts, including non-medical and/or non-surgical contexts.

Console 200 includes a processor 210. In some embodiments, processor 210 may correspond to one or more processors of a control system, such as control system 112. Consistent with such embodiments, processor 210 may execute instructions corresponding to methods and operations described herein.

Console 200 may also include a display 220 coupled to processor 210. In some embodiments, display 220 may correspond to a display system, such as display system 110. Consistent with such embodiments, display 220 may include a surgical image view 221 that displays an image and/or representation of a surgical site. The image and/or representation may include live and/or real-time images, virtual images, pre-operative images, and/or the like of a workspace, such as a portion of patient anatomy in some medical embodiments. In some embodiments, one or more medical instruments 222 and 223 may appear in surgical image view 221. For illustrative purposes, medical instruments 222 and 223 are depicted as a pair of graspers. More generally, medical instruments 222 and/or 223 may correspond to any suitable types of medical instruments, such as medical instrument 104. In some embodiments, display 220 may include one or more menus 224 and 225 positioned to the top, bottom, and/or side of surgical image view 221 and/or overlaid on surgical image view 221. In some embodiments, menus 224 and/or 225 may be persistent and/or may appear dynamically.

Console 200 may further include or be associated with an eye tracker 230 to determine a gaze point 235 of operator O with respect to display 220. Although gaze point 235 is depicted on display 220 using crosshairs for reference purposes, it is to be understood that the crosshairs may or may not actually appear on display 220. Examples of devices and methods that may be used to implement eye tracker 230 are described in further detail in U.S. patent application Ser. No. 15/126,074, entitled "Medical Devices, Systems, and Methods Using Eye Gaze Tracking," which is hereinafter incorporated by reference in its entirety.

Console 200 may also include an input device 240 (e.g., a touchpad, a mouse, a keyboard, a joystick, foot pedals, a voice command processor, and/or the like). In some embodiments, input device 240 may correspond to a master assembly, such as master assembly 106. In general, input device 240 may receive inputs from operator O using any suitable techniques other than eye tracking. For example, input device 240 may include a manual input device.

It is generally desirable for console 200 to provide operator O with a wide range of information and/or controls to effectively carry out the surgical procedure. For example, console 200 may present a variety of supplementary information to operator O. Examples of supplementary information may include auxiliary views (e.g., pre-operative images, CT data, MRI data, fluoroscopy images, and/or the like), patient and/or instrument monitoring data, notifications, alerts, and/or the like. Likewise, display 220 may include one or more controls that allow operator O to perform one or more actions, such as adjusting parameters, manipulating data (e.g., capture a snapshot, save data, and/or the like), performing surgical tasks, and/or the like. Illustrative examples of controls include, but are not limited to, menus, sliders, knobs, scrollbars, buttons, form entry fields, and/or the like. In some embodiments, the controls may be used to adjust display parameters, adjust instrument parameters, capture a snapshot, store and/or retrieve data, control the surgical environment (e.g., adjust the settings of operating table T, patient insufflation, and/or the like), and/or the like.

On the other hand, it is desirable for console 200 to provide an immersive environment for operator O, e.g., an environment with few sensory distractions that creates and maintains a sense of presence, flow, and/or focus with respect to the surgical procedure. Accordingly, there is a tension between the desire to increase the amount of information and/or number of controls presented on display 220 and the desire to reduce visual clutter that may diminish the sense of immersion.

In this regard, eye tracker 230 provides a mechanism for console 200 to understand what operator O is currently trying to accomplish and limit the presentation of information and/or controls to those which are useful to the task at hand. In particular, display 220 may include one or more activation regions 251-259. When the gaze of operator O is directed toward one of activation regions 251-259 (i.e., when gaze point 235 falls within one of activation regions 251-259), information and/or controls may appear and/or may be highlighted, magnified, and/or the like. At other times, when gaze point 235 does not fall within one of activation regions 251-259, the information and/or controls may be disabled (e.g., hidden, grayed out, minimized, and/or the like). Consequently, the visual impact of the information and/or controls is limited until operator O looks at one of activation regions 251-259.

In some embodiments, one or more of activation regions 251-259, such as activation regions 251-256, may correspond to menu items of menus 224 and/or 225. In some embodiments, one or more of activation regions 251-259, such as activation region 257, may correspond to edges and/or corners of surgical image view 221. In some embodiments, one or more of activation regions 251-259, such as activation regions 258 and 259, may dynamically track one or more features appearing in surgical image view 221, such as medical instruments 222 and 223.

Figure 2A:
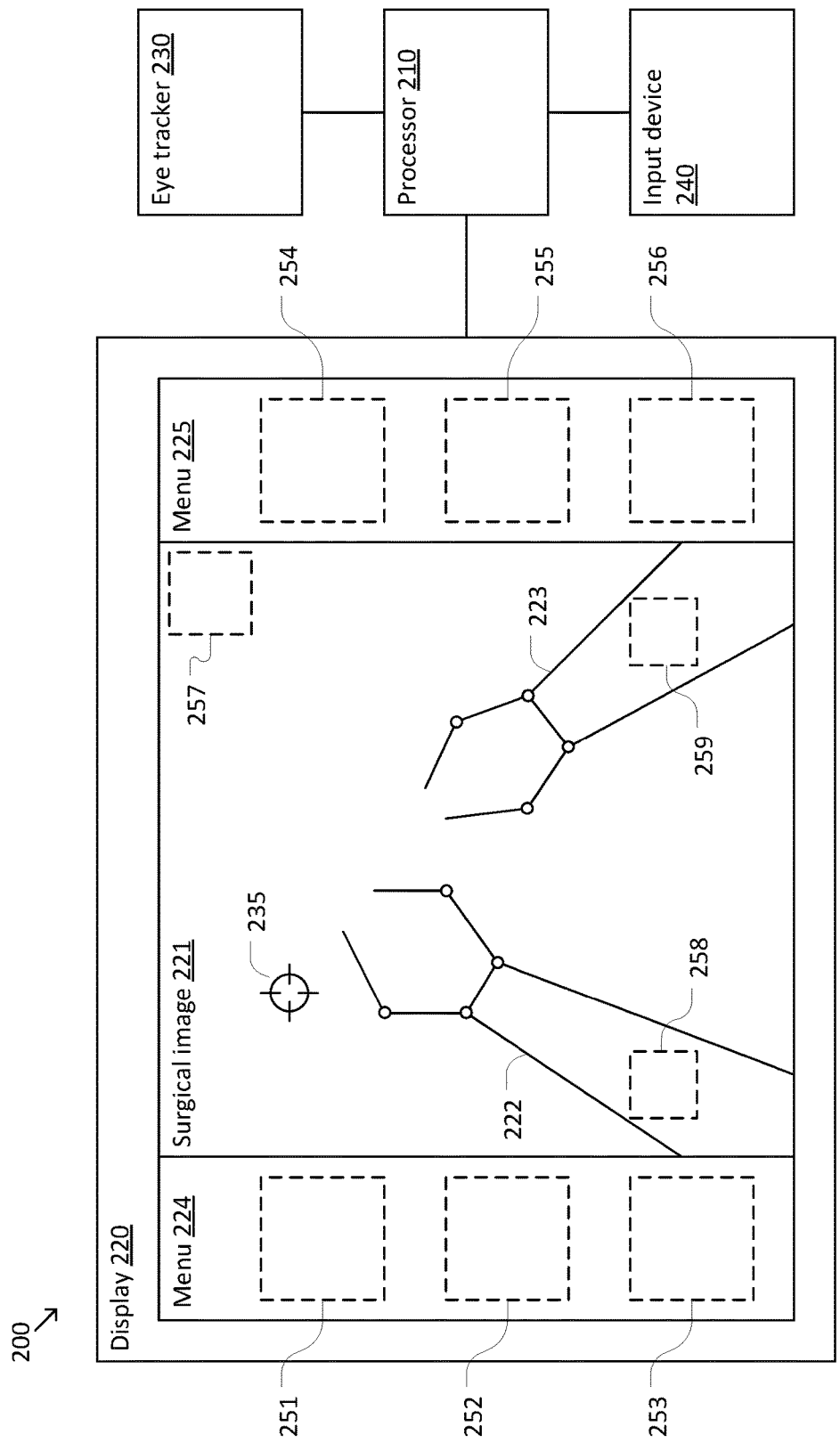
FIGS. 2A-2F are simplified diagrams of a console of a medical system according to some embodiments.
Figure 2B:
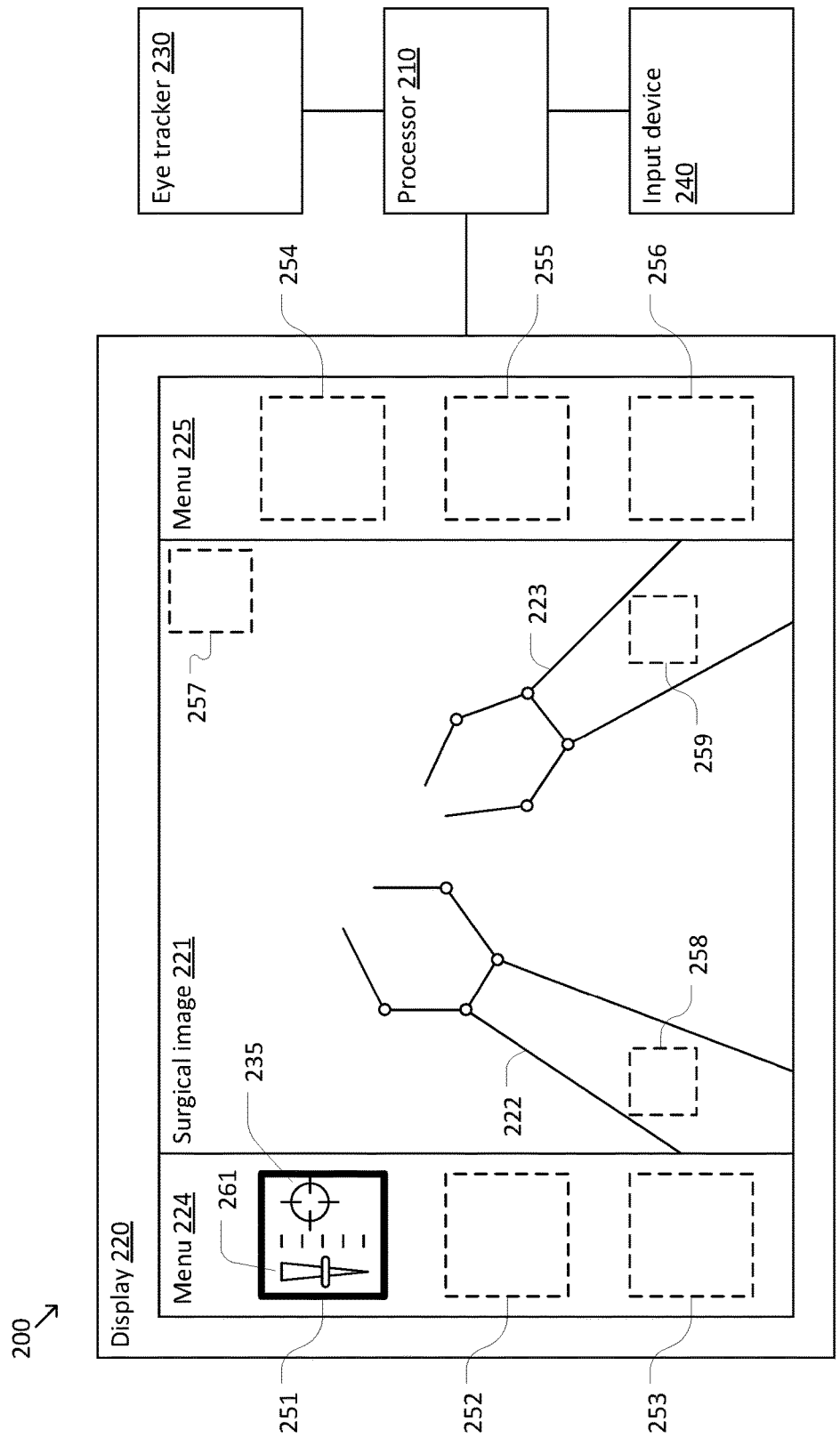

As depicted in FIG. 2A, gaze point 235 does not fall within one of activation regions 251-259. Accordingly, none of activation regions 251-259 are triggered, allowing operator O to focus on surgical image view 221 with little visual distraction. Conversely, in FIG. 2B, gaze point 235 falls within activation region 251. As a result, an indicator and/or control 261 corresponding to activation region 251 is activated (e.g., magnified, highlighted, and/or the like). In some examples, the relative proportions of menu 227 may change in response to operator O looking at activation region 251, e.g., menu 227 may expand into surgical image view 221.

Although the eye tracking features described above may provide an effective mechanism for operator O to access information on demand, eye tracking generally provides a limited ability to adjust parameters of controls and/or perform other fine-tuning tasks. For example, even if it is feasible for operator O to adjust a parameter using eye tracking, doing so may involve significant eye strain and/or otherwise be uncomfortable and/or non-intuitive for operator O. Accordingly, using eye tracking to adjust controls may reduce the immersive effect of console 200. Additionally or alternatively, operator O may resort to adjusting the control through a separate routine (e.g., pulling up a separate control panel on display 220), thereby breaking immersion entirely.

Figure 2C:
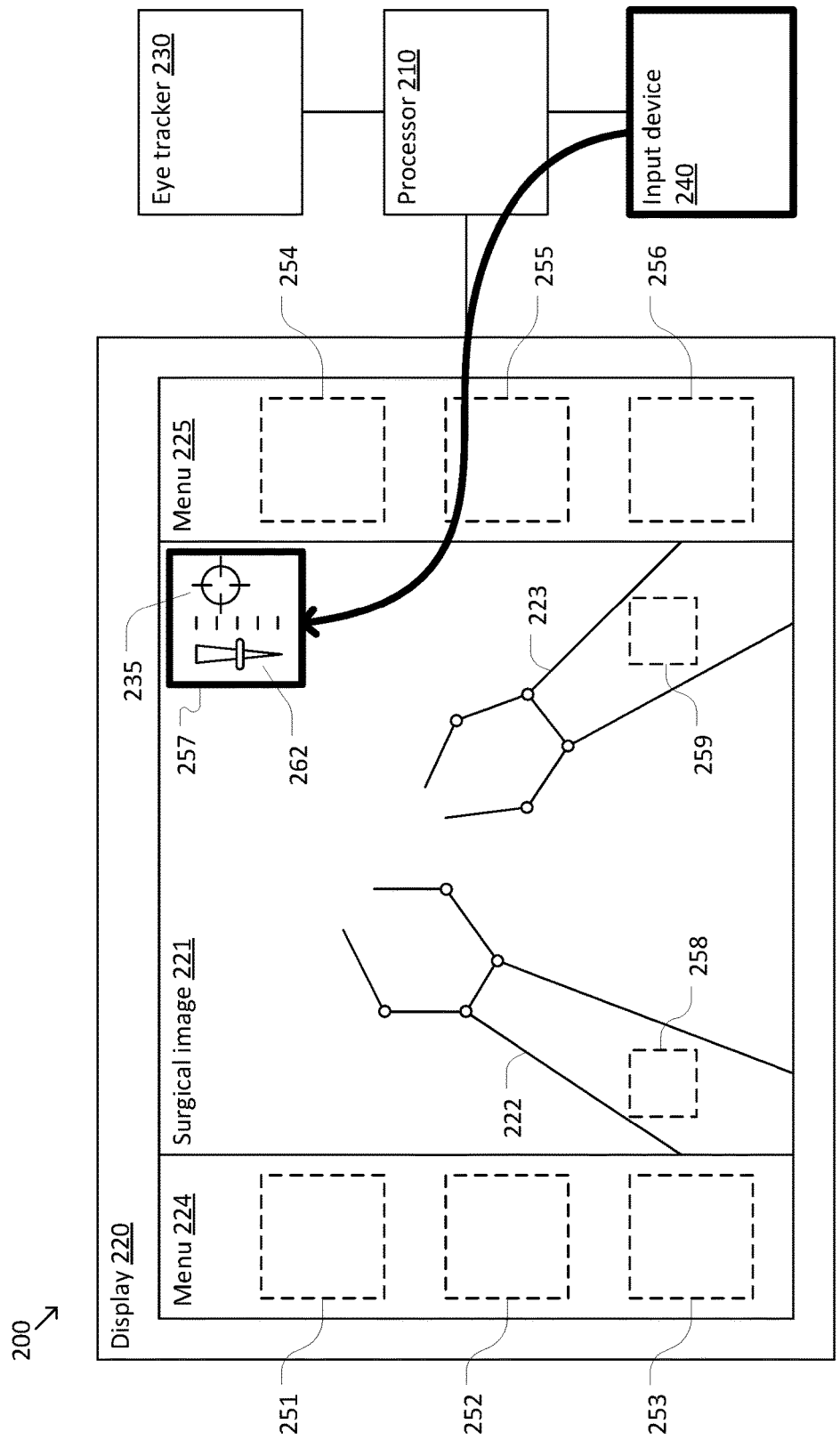

To address these challenges, console 200 may implement a hybrid control technique in which eye tracking is used to activate a control, and operator input from input device 240 is subsequently used to set and/or adjust the control. An illustrative embodiment is depicted in FIG. 2C. When operator O looks at activation region 257, a control 262 is activated. However, rather than, and/or in addition to, adjusting control 262 using eye tracking, control 262 may be adjusted using input device 240. For example, when input device 240 includes a touch pad, operator may increase and/or decrease a parameter of control 262 by scrolling up and/or down using the touch pad. Operator O may then confirm the adjusted parameter by clicking a button of input device 240. Examples of parameters that may be adjusted using the hybrid control techniques described herein include, but are not limited to, the energy setting of an instrument such as a cautery device, insufflation settings, and/or the like.

Figure 2D:
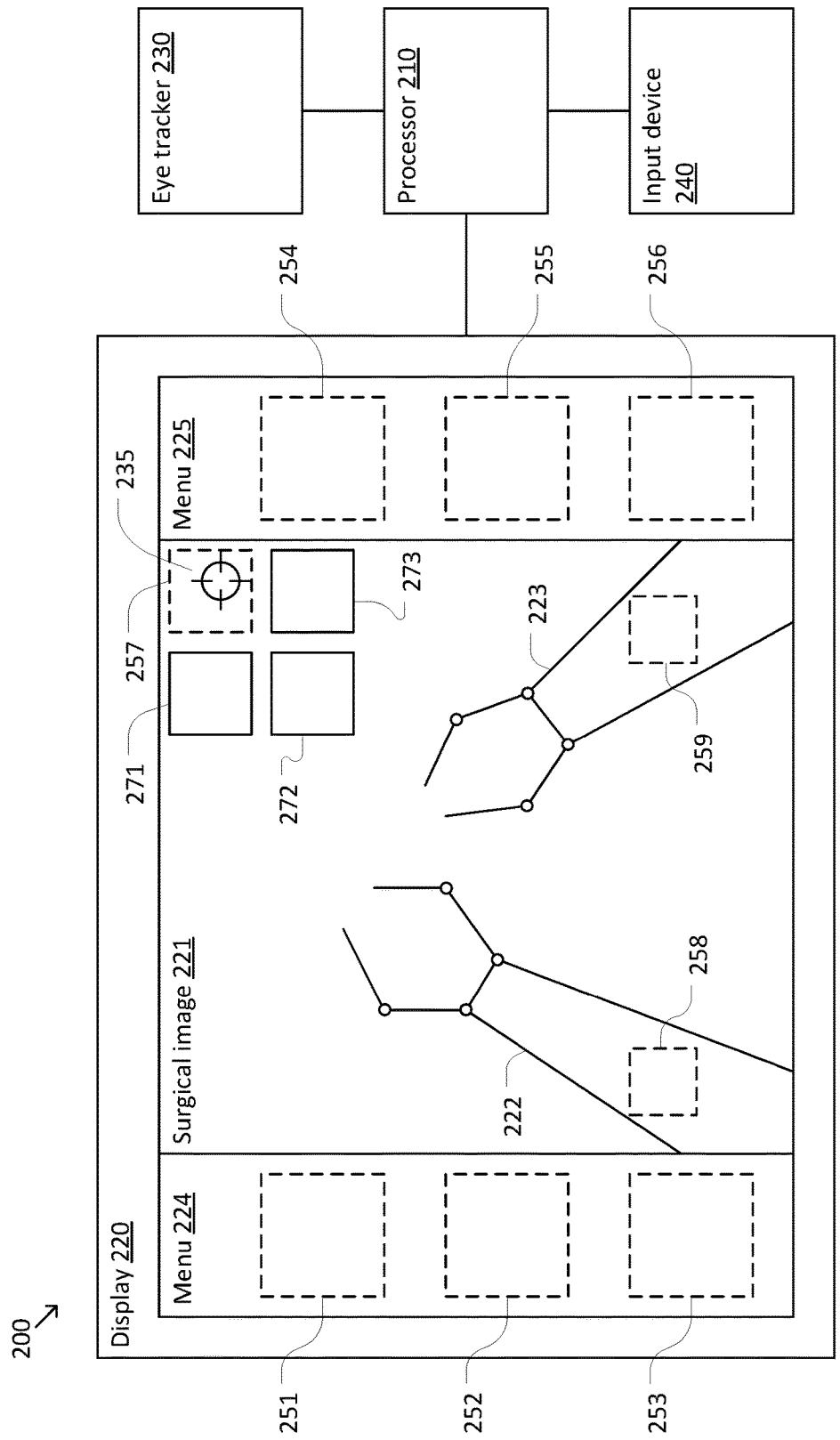
Figure 2E:
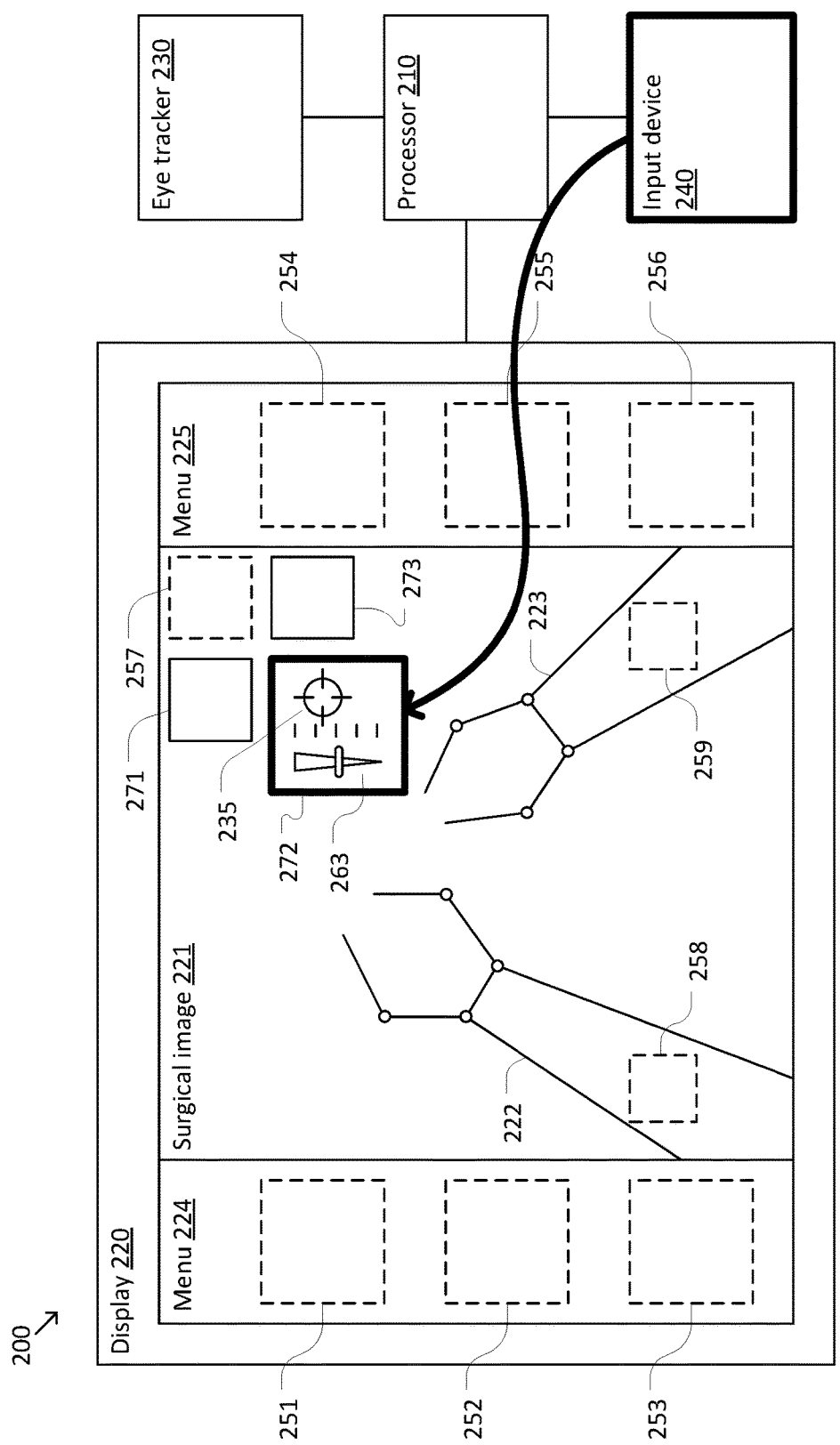
Figure 2F:
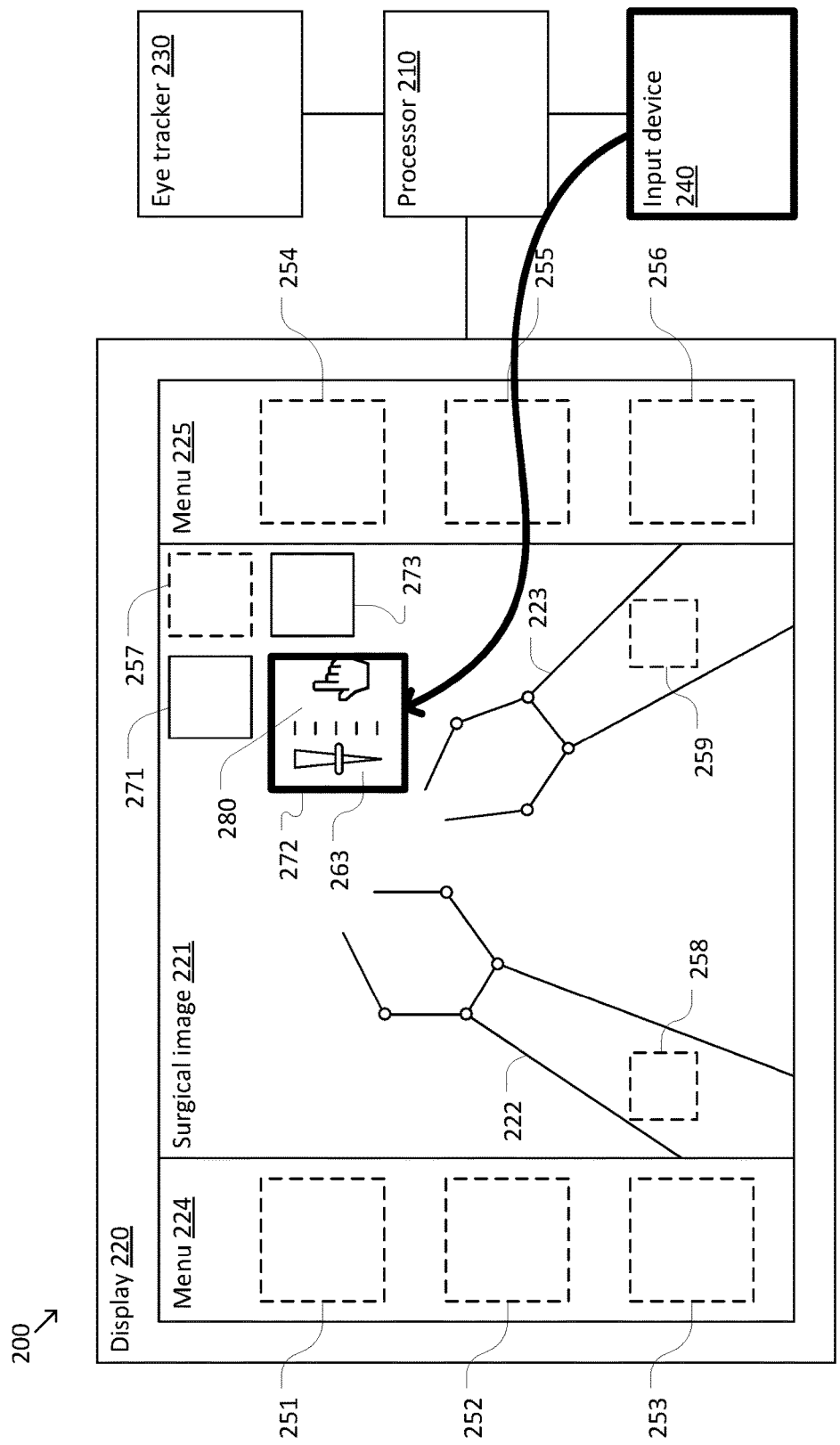

In some embodiments, a plurality of secondary activation regions 271-273 may appear when operator O looks at one of activation regions 251-259. Operator O may subsequently activate controls corresponding to secondary activation regions 271-273 using eye tracker 230 and/or input device 240. Operator O may then adjust the parameters of the selected control using input device 240. For example, as depicted in FIG. 2D, secondary activation regions 271-273 appear when operator O looks at activation region 257. Operator O may then select one of secondary activation regions 271-273 using eye tracking, as depicted in FIG. 2E, causing control 263 to appear. Additionally or alternately, a cursor 280 may appear to allow operator O to select one of secondary activation regions 271-273 using input device 240, as depicted in FIG. 2F. Once selected, operator O may adjust the parameters associated with control 263 using input device 240.

Figure 3:
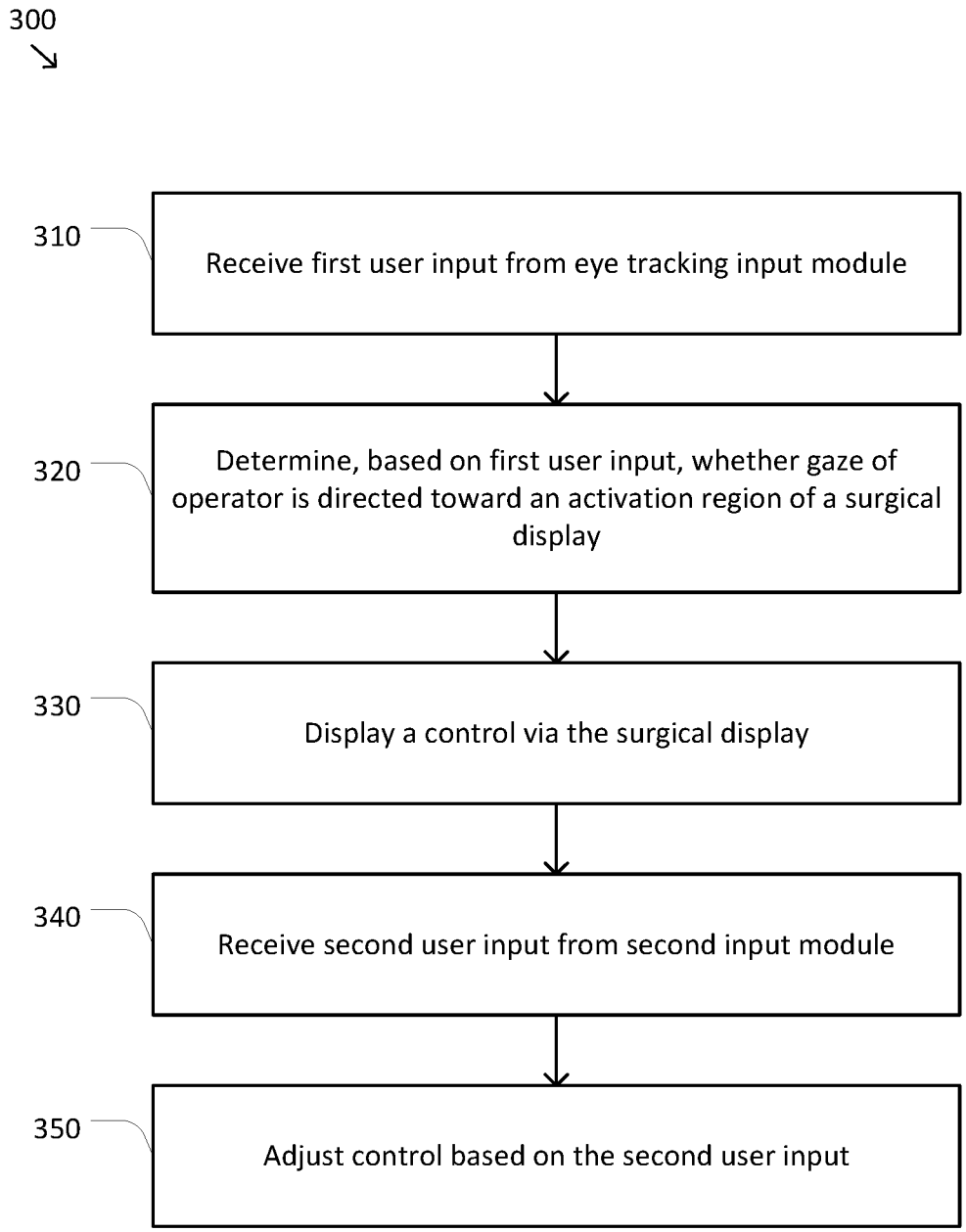
FIG. 3 is a simplified diagram of a method for hybrid control using eye tracking according to some embodiments.

FIG. 3 is a simplified diagram of a method 300 for hybrid control using eye tracking according to some embodiments. In some embodiments consistent with FIGS. 1-2F, method 300 may be performed by teleoperated medical system 100 and/or console 200 during a surgical procedure. Consistent with such embodiments, method 300 may provide an immersive environment for an operator, such as operator O, thereby increasing the likelihood of a successful clinical outcome. In some embodiments, one or more processes of method 300 may be carried out by a processor, such as processor 210.

At a process 310, a first user input is received from an eye tracking input module, such as eye tracker 230. In some embodiments, the first user input may correspond to a gaze of operator O. For example, the eye tracking input module may measure a gaze point, such as gaze point 235, relative to a surgical display, such as display 220. Consistent with such embodiments, operator O may provide the first user input simply by looking at the surgical display in the ordinary and/or natural course of performing the surgical procedure. In this regard, process 310 may provide an immersive mechanism for providing the first user input.

At a process 320, it is determined, based on the first input, whether the gaze of operator O is directed toward an activation region, such as one of activation regions 251-259, of the surgical display. In general, the activation region may correspond to any predefined region of the surgical display, such as a corner and/or edge, a menu item, a dynamic location that tracks a feature (e.g., a medical instrument, such as medical instruments 222 and/or 223) appearing in the surgical display, and/or the like. The activation region may or may not be visibly indicated on the surgical display. For example, a marker (e.g., an icon, a tile image, a grayed out control, and/or the like) may be displayed at the location of the activation region.

At a process 330, in response to determining that the gaze of the operator is directed toward the activation region, a control is displayed via the surgical display. In some embodiments, the control may allow operator O to perform one or more actions, such as adjusting a display parameter and/or a surgical parameter, capturing a snapshot, manipulating data, performing a surgical task, and/or the like. In an illustrative embodiment, the control may allow operator O to adjust the energy settings of a cautery device and/or adjust the insufflation level of the patient. Consistent with such embodiments, the control may be represented using a menu, a button, a knob, a slider, a scrollbar, a textual and/or numerical input field, and/or any other suitable representation that allows operator O to make a selection. In some embodiments, when the control is hidden prior to process 330, the control may appear at process 330. In some embodiments, when the control is disabled, grayed out, and/or minimized prior to process 330, the control may be enabled, highlighted, and/or magnified at process 330. In some embodiments, a plurality of controls may appear at process 330.

At a process 340, a second user input is received from a second input module, such as input device 240. In some embodiments, the second user input may include a manual input (e.g., a user touch on a touchpad, a mouse click, a keystroke, and/or the like), a foot pedal press, a voice command, and/or any other suitable type of input. Whereas the first user input occurs naturally as the operator O looks at the surgical display, the second user input may involve an affirmative action by operator O. In this regard, the second user input may provide a more effective means of performing adjustments and/or fine-tuning than the first user input.

At a process 350, the control is adjusted based on the second user input. In general, the adjustment depends on the type of control and may be adjusted in a variety of ways. For example, when the control includes a menu, the second user input may correspond to operator O selecting an item on the menu. Likewise, when the control includes a level-setting control (e.g., a slider, knob, and/or the like), the second user input may correspond to operator O setting the level of the control. In some embodiments, various cursors, highlights, and/or the like may appear on the surgical display to assist operator O in adjusting the control.

Some examples of processors, such as processor 210, may include non-transient, tangible, machine readable media that include executable code that when run by one or more processors (e.g., processor 210) may cause the one or more processors to perform the processes of method 300. Some common forms of machine readable media that may include the processes of methods 300 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A console for a medical system comprising:
a display;
an eye tracking input module;
a second input module; and
one or more processors coupled to the display, the eye tracking input module, and the second input module, the one or more processors being configured to perform operations comprising:
displaying, via the display, a surgical image view;
receiving a first user input from the eye tracking input module, the first user input corresponding to a gaze point of a user relative to the display;
determining, based on the first user input, whether the gaze point of the user moves within a primary activation region of the display;
in response to determining that the gaze point of the user moves within the primary activation region, overlaying a plurality of secondary activation regions on the surgical image view;
receiving a second user input from the eye tracking input module, the second user input corresponding to the gaze point of the user relative to the display;
determining, based on the second user input, that the gaze point of the user moves within a selected one of the plurality of secondary activation regions;
in response to determining that the gaze point of the user moves within the selected one of the plurality of secondary activation regions, changing an appearance of the selected one of the plurality of secondary activation regions to include displaying of an adjustable control, the adjustable control configured to adjust a parameter in a surgical procedure;
receiving a third user input from the second input module; and
adjusting the displayed adjustable control, based on the third user input, to increase or decrease the parameter.

2. The console of claim 1, wherein the primary activation region is within the surgical image view.

3. The console of claim 1, wherein the second input module includes a touch pad.

4. The console of claim 1, wherein the parameter includes a display setting of the display and the adjustable control is associated with increasing or decreasing the display setting.

5. The console of claim 1, wherein the parameter includes an energy level of a cautery device and the adjustable control is associated with increasing or decreasing the energy level of the cautery device.

6. The console of claim 1, wherein the primary activation region is within a surgical image view and is not visibly indicated until after the determination that the gaze point of the user is directed toward the primary activation region.

7. The console of claim 1, wherein the parameter includes an insufflation level of a patient, and the adjustable control is associated with increasing or decreasing the insufflation level.

8. The console of claim 1,
wherein the adjustable control is hidden prior to determining that the gaze point of the user moves within the selected one of the plurality of secondary activation regions, and wherein changing an appearance of the selected one of the plurality of secondary activation regions includes causing the adjustable control to appear on the selected one of the plurality of secondary activation regions, or
wherein the adjustable control is grayed out prior to determining that the gaze point of the user moves within the selected one of the plurality of secondary activation regions, and wherein changing an appearance of the selected one of the plurality of secondary activation regions includes highlighting the adjustable control on the selected one of the plurality of secondary activation regions, or
wherein the adjustable control is minimized prior to determining that the gaze point of the user moves within the selected one of the plurality of secondary activation regions, and wherein changing an appearance of the selected one of the plurality of secondary activation regions includes magnifying the adjustable control on the selected one of the plurality of secondary activation regions.

9. The console of claim 1, wherein the primary activation region corresponds to a fixed region of the display.

10. The console of claim 1, wherein the primary activation region dynamically tracks a location of a medical instrument that appears on the display and the adjustable control is associated with a parameter of the medical instrument.

11. A system comprising:
a memory; and
one or more processors coupled to the memory, the one or more processors being configured to read instructions from the memory and perform operations comprising:
displaying, via a display, a surgical image view;
receiving a first input from an eye tracker, the first input corresponding to a gaze point of a user relative to the display;
determining, based on the first input, whether the gaze point moves within a primary activation region of the display;
in response to determining that the gaze point moves within the primary activation region, overlaying a plurality of secondary activation regions on the surgical image view;
receiving a second input from the eye tracker;
determining, based on the second input, that the gaze point of the user moves within a selected one of the plurality of secondary activation regions;
in response to determining that the gaze point of the user moves within the selected one of the plurality of secondary activation regions, changing an appearance of the selected one of the plurality of secondary activation regions to include displaying of an adjustable control, the adjustable control configured to adjust a parameter in a surgical procedure;
receiving a third input from an input device; and
adjusting the displayed adjustable control, based on the third input, to increase or decrease the parameter.

12. The system of claim 11, wherein the primary activation region is within the surgical image view.

13. The system of claim 11, wherein the input device includes a touch pad.

14. The system of claim 11, wherein the parameter includes a display setting of the display and the adjustable control is associated with increasing or decreasing the display setting.

15. The system of claim 11, wherein the parameter includes an energy level of a cautery device and the adjustable control is associated with increasing or decreasing the energy level of the cautery device.

16. The system of claim 11, wherein the primary activation region is within a surgical image view and is not visibly indicated until after the determination that the gaze point of the user is directed toward the primary activation region.

17. The system of claim 11, wherein the parameter includes an insufflation level of a patient, and the adjustable control is associated with increasing or decreasing the insufflation level.

18. The system of claim 11,
wherein the adjustable control is hidden prior to determining that the gaze point of the user moves within the selected one of the plurality of secondary activation regions, and wherein changing an appearance of the selected one of the plurality of secondary activation regions includes causing the adjustable control to appear on the selected one of the plurality of secondary activation regions, or
wherein the adjustable control is grayed out prior to determining that the gaze point of the user moves within the selected one of the plurality of secondary activation regions, and wherein changing an appearance of the selected one of the plurality of secondary activation regions includes highlighting the adjustable control on the selected one of the plurality of secondary activation regions, or
wherein the adjustable control is minimized prior to determining that the gaze point of the user moves within the selected one of the plurality of secondary activation regions, and wherein changing an appearance of the selected one of the plurality of secondary activation region regions includes magnifying the adjustable control on the selected one of the plurality of secondary activation regions.

19. The system of claim 11, wherein the primary activation region corresponds to a fixed region of the display.

20. The system of claim 11, wherein the primary activation region dynamically tracks a location of a medical instrument that appears on the display and the adjustable control is associated with a parameter of the medical instrument.

* * * * *